(12) United States Patent
Han et al.

(10) Patent No.: US 8,900,483 B2
(45) Date of Patent: Dec. 2, 2014

(54) POLYMER ELECTROLYTE COMPOSITION AND DYE-SENSITIZED SOLAR CELL CONTAINING THE SAME

(75) Inventors: Yonggyu Han, Daejeon (KR); Sujith Sudevan, Daejeon (KR); MyungAhn Ok, Daejeon (KR); Jisu Jeong, Daejeon (KR); SungJae Na, Daejeon (KR); KwangJin Chung, Daejeon (KR); Dong-Won Kim, Seoul (KR); YeonJeong Choi, Seoul (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 333 days.

(21) Appl. No.: 13/431,411

(22) Filed: Mar. 27, 2012

(65) Prior Publication Data
US 2013/0075666 A1    Mar. 28, 2013

(30) Foreign Application Priority Data
Mar. 29, 2011   (KR) ........................ 10-2011-0027972

(51) Int. Cl.
| | |
|---|---|
| H01B 1/00 | (2006.01) |
| C08K 3/30 | (2006.01) |
| H01L 35/24 | (2006.01) |
| H01G 9/20 | (2006.01) |
| H01B 1/12 | (2006.01) |
| C08K 3/20 | (2006.01) |

(52) U.S. Cl.
CPC ............... *H01B 1/124* (2013.01); *Y02E 10/542* (2013.01); *H01G 9/2009* (2013.01); *C08K 3/20* (2013.01)
USPC ........... 252/500; 252/62.2; 136/263; 429/300

(58) Field of Classification Search
USPC ........ 252/62.2, 500, 518.1; 429/300; 136/263
See application file for complete search history.

(56) References Cited

U.S. PATENT DOCUMENTS

| | | |
|---|---|---|
| 2006/0254640 A1 | 11/2006 | Park et al. |
| 2010/0051097 A1 | 3/2010 | Kang et al. |

FOREIGN PATENT DOCUMENTS

| | | | |
|---|---|---|---|
| JP | 2006179235 A | * | 7/2006 |
| KR | 100553337 B1 | | 2/2006 |

(Continued)

OTHER PUBLICATIONS

Choi et al "Quasi-solid-state dye-sensitized solar cells using nanocomposite gel polymer electrolytes based on poly(propylene carbonate)", Macromolecular Chemistry and Physics, 2011, 212, 2583-2588 (Dec. 2011).*

(Continued)

*Primary Examiner* — Mark Kopec
(74) *Attorney, Agent, or Firm* — The Webb Law Firm

(57) ABSTRACT

Disclosed is a polymer electrolyte composition, a gel-type polymer electrolyte obtained by mixing the same at normal temperature, and a dye-sensitized solar cell containing the electrolyte. Since the poly(alkylene carbonate)-based polymer is included, a crosslinking process by radiation of heat or UV is not required when the polymer electrolyte is manufactured, such that a manufacturing process is simple. Accordingly, the polymer electrolyte is useful for mass production of a solar cell and maintained in a uniform state without a phase separation between two components due to excellent affinity between the polymer and the organic solvent included in the electrolyte, and has excellent electrode-electrolyte interface property in the solar cell due to an adhesive property of the gelled polymer electrolyte.

13 Claims, 1 Drawing Sheet

(56) References Cited

FOREIGN PATENT DOCUMENTS

| | | | |
|---|---|---|---|
| KR | 1020060118068 A | 11/2006 | |
| KR | 100656361 B1 | 12/2006 | |
| KR | 1020070060960 A | 6/2007 | |
| KR | 100751331 B1 | 8/2007 | |
| KR | 20080044675 A | 5/2008 | |
| KR | 1020090107861 A | 10/2009 | |
| KR | 1020110000365 A | 1/2011 | |

OTHER PUBLICATIONS

Zhou et al "Non-volatile polymer electrolyte based on poly(propylene carbonate, ionic liquid, and lithium perchlorate for electrochromic devices", Journal of Physical Chemistry B, 2013, 117, 7783-7789.*

Kolosnitsyn et al "Lithium-conducting polymer electrolytes . . . ", Russian Journal of Applied Chemistry, vol. 78, No. 1, 2005, pp. 1-18.*

Dukhanin et al "Lithium conductivity polymer electrolyte based on poly(propylene carbonate)-lithium perchlorate system", VII Intl. Conf. "Basic problems of energy conservation . . . ", Saratov, Jun. 24-28, 2002, (Abstract).*

O'Regan et al., A low-cost, high-efficiency solar cell based on dye-sensitized colloidal TiO2 films, Nature, Oct. 24, 1991, pp. 737-740, vol. 353.

* cited by examiner

POLYMER ELECTROLYTE COMPOSITION AND DYE-SENSITIZED SOLAR CELL CONTAINING THE SAME

CROSS-REFERENCE TO RELATED APPLICATIONS

This application claims priority under 35 U.S.C. §119 to Korean Patent Application No. 10-2011-0027972, filed on Mar. 29, 2011, in the Korean Intellectual Property Office, the disclosure of which is incorporated herein by reference in its entirety.

TECHNICAL FIELD

The present invention relates to a polymer electrolyte composition, a gel-type polymer electrolyte obtained by mixing the same at normal temperature, and a dye-sensitized solar cell containing the electrolyte.

BACKGROUND

A dye-sensitized solar cell developed by Gratzel, et al., from Switzerland in 1991 is a photoelectric chemical cell containing a semiconductor nanoparticle having titanium dioxide ($TiO_2$) as a main component, a dye for absorbing the sun's rays, an electrolyte, and a platinum counter electrode (Nature, Vol. 353, p. 737, 1991), and has advantages in that a manufacturing cost is low as compared to a silicon solar cell, there is a transparent property in the cell, the flexible cell can be manufactured, and the cell is relatively less sensitive to environmental changes. The dye-sensitized solar cell and a known silicon solar cell by a p-n conjunction are different from each other in that an absorption process of solar energy and a process of separating electron-hole couples to form a current flow are performed simultaneously in the known solar cell, but, in the dye-sensitized solar cell, the absorption process of solar energy and a charge transfer process are separated, solar energy is absorbed by using a dye, and the charge is transferred in an electron form by using a semiconductor.

The dye-sensitized solar cell attracts attention as a new regeneration energy source having a current power generation cost level because environmentally harmless materials are used and a manufacturing cost is ⅕ of that of a silicon solar cell. Even though the dye-sensitized solar cell has many aforementioned advantages, commercialization of the dye-sensitized solar cell has significant problems in view of long term stability and toxicity due to liquid leakage of the electrolyte solution and vaporization of the solvent when the solar cell is operated over a long period of time. The reason is because the electrolyte that has been used in the dye-sensitized solar cell includes a liquid volatile organic solvent such as acetonitrile. Accordingly, there is a demand for developing a novel polymer electrolyte material solving the aforementioned problems and improving cell performance.

Examples of a known method of manufacturing a polymer electrolyte include a method of adding a polymer to liquid electrolyte to perform physical gelling (Korean Patent No. 10-0553337 and Korean Patent Laid-Open Publication No. 10-2009-0107861) and a method of adding a monomer or a reactive oligomer to liquid electrolyte to perform polymerization, thus implementing chemical gelling (Korean Patent Laid-Open Publication Nos. 2006-0118068 and 2007-0060960). The physically gelled polymer electrolyte has problems in that a phase separation phenomenon may occur between the polymer and the organic solvent over time and resistance of a charge transfer-reaction is increased at an interface between an electrode and an electrolyte due to insufficient adhesive force to a metal oxide layer to reduce current and efficiency properties. Meanwhile, in the case where the monomer or the oligomer is added to the liquid electrolyte to perform gelling by a polymerization or crosslinking reaction, there are problems in that there is a high possibility of compounds remaining such as an initiator and a crosslinking agent added during the crosslinking and polymerization reactions and voltage or current properties of the solar cell are reduced when the compounds remain in the electrolyte.

SUMMARY

An embodiment of the present invention is directed to providing a polymer electrolyte composition having excellent affinity to an organic solvent included in an electrolyte, ion conductive property, and adhesive property to an electrode.

Another embodiment of the present invention is directed to providing a dye-sensitized solar cell that is capable of minimizing volatilization of an electrolytic solution or leakage of liquid considered problems of a known dye-sensitized solar cell using a liquid electrolyte, being used over a long period of time, and maintaining stable conversion efficiency at a predetermined level or more.

In one general aspect, a polymer electrolyte composition for a dye-sensitized solar cell includes a poly(alkylene carbonate)-based polymer containing a repeating unit represented by the following Formula 1; a high boiling point solvent; a redox derivative; and a ceramic particle.

[Formula 1]

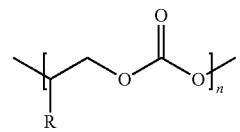

wherein R is a hydrogen atom; a straight chained, cyclic, or branched chained alkyl group having 1 to 20 carbon atoms, which may include a hetero element such as oxygen, sulfur or nitrogen and fluorine; or an aromatic alkyl group having 6 to 20 carbon atoms.

In the polymer electrolyte composition for a dye-sensitized solar cell according to the general aspect of the present invention, a weight average molecular weight of the poly(alkylene carbonate)-based polymer may be 1,000 to 1,000,000 g/mole.

In the polymer electrolyte composition for the dye-sensitized solar cell according to the detailed aspect of the present invention, the poly(alkylene carbonate)-based polymer may be poly(ethylene carbonate), poly(propylene carbonate), poly(butylenes carbonate), poly(cyclohexyl carbonate), or a derivative or a mixture thereof.

In the polymer electrolyte composition for the dye-sensitized solar cell according to the preferable aspect of the present invention, a content of the poly(alkylene carbonate)-based polymer may be 5 to 95 wt %.

In the polymer electrolyte composition for the dye-sensitized solar cell according to the general aspect of the present invention, the high boiling point solvent may be a single material or a mixture selected from cyclic carbonate, lactones, and normal temperature molten salts.

In the polymer electrolyte composition for the dye-sensitized solar cell according to the detailed aspect of the present invention, the high boiling point solvent may be a single material or a mixture selected from ethylene carbonate, propylene carbonate, a cyclic derivative thereof, gamma-butyrolactone, and an ionic liquid.

In the polymer electrolyte composition for the dye-sensitized solar cell according to the detailed aspect of the present invention, the redox derivative may provide a redox couple of $I^-/I_3^-$.

In the polymer electrolyte composition for the dye-sensitized solar cell according to the general aspect of the present invention, the ceramic particle may be a single material or a mixture selected from $Al_2O_3$, $SiO_2$, $TiO_2$, $SnI_2$, $CeO_2$, $ZrO_2$, $BaTiO_3$, $Y_2O_3$, and zeolite.

On the preferable aspect, an average particle diameter of the ceramic particle may be 0.0001 to 1,000 μm.

On the preferable aspect, a content of the ceramic particle may be 2 to 20 wt %.

The polymer electrolyte composition of the present invention provides a gel-type polymer electrolyte through a simple mixing process at normal temperature.

On another general aspect, a dye-sensitized solar cell includes the electrolyte.

The polymer electrolyte according to the aspects of the present invention does not require a crosslinking process by radiation of heat or UV when the polymer electrolyte is manufactured, such that a manufacturing process is simple. Accordingly, the polymer electrolyte is useful for mass production of a solar cell and maintained in a uniform state without a phase separation of two components due to excellent affinity between the polymer and the organic solvent included in the electrolyte, and has excellent electrode-electrolyte interface property in the solar cell due to an adhesive property of the gelled polymer electrolyte. A dye-sensitized solar cell containing the same as an electrolyte is capable of being used over a long period of time and maintaining stable conversion efficiency at a predetermined level or more. Further, since the manufactured solar cell is in a quasi-solid state, it is possible to manufacture a flexible solar cell having a size and a shape freely controlled to a required level.

DETAILED DESCRIPTION OF EMBODIMENTS

Figure 1:
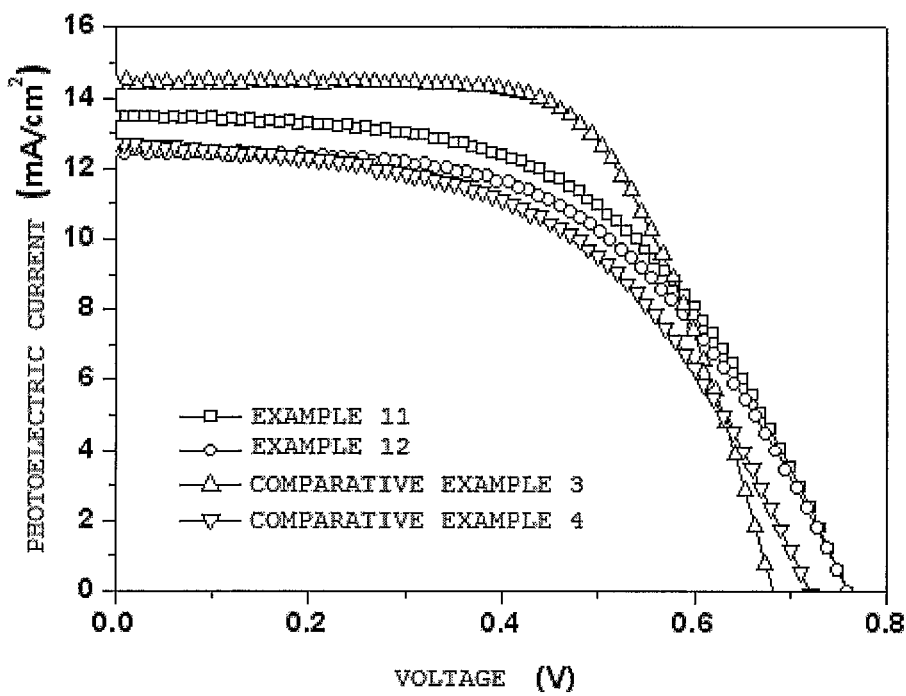
FIG. 1 is a current-voltage curve obtained by radiating xenon (Xe) white light and light of 100 mW/cm² under an AM 1.5 filter condition on dye-sensitized solar cells manufactured in Examples 11 and 12 and Comparative examples 3 and 4 applied to the present invention.

In one general aspect of the present invention, a polymer electrolyte composition for a dye-sensitized solar cell includes a poly(alkylene carbonate)-based polymer containing a repeating unit represented by the following Formula 1 as a matrix polymer.

[Formula 1]

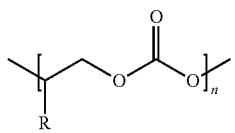

wherein R is a hydrogen atom; a straight chained, cyclic, or branched chained alkyl group having 1 to 20 carbon atoms, which may include a hetero element such as oxygen, sulfur or nitrogen and fluorine; or an aromatic alkyl group having 6 to 20 carbon atoms.

Carbonate (–OCOO) of a main chain of the polymer has a carbon bond, such that affinity to carbonate or a lactone-based organic solvent is excellent. Accordingly, when the polymer electrolyte containing carbonates as the matrix polymer is manufactured, a phase separation phenomenon does not occur between the polymer and the organic solvent over the time, and an excellent mixed interface adhesive property is ensured between the electrode and the electrolyte. Therefore, the polymer electrolyte containing the polymer matrix does not cause leakage of the liquid and the volatilizations, and when the polymer electrolyte is applied to the dye-sensitized solar cell, high efficiency and excellent long-term stability may be obtained.

Further, the matrix polymer is capable of being physically gelled by a simple mixing process at normal temperature without a polymerization or crosslinking reaction when the polymer electrolyte is manufactured.

Specifically, the poly(alkylene carbonate)-based polymer has excellent affinity to organic solvents such as linear carbonates, cyclic carbonates, and lactones used as an electrolyte solution of the dye-sensitized solar cell electrolyte, such that a phase separation phenomenon does not occur even though the poly(alkylene carbonate)-based polymer is stored over a long period of time while being mixed therewith. Further, since a glass transition temperature is low, the movement of chains is active, and a structure that is easy to transfer ions is ensured, such that oxygen elements included in the main chain help dissociate salts in the electrolyte.

Further, the poly(alkylene carbonate)-based polymer may be introduced to physically gel the electrolyte composition containing the poly(alkylene carbonate)-based polymer in the dye-sensitized solar cell, such that a gel polymer electrolyte may be formed without application of external heat treatment or provision of an additional crosslinking catalyst. A chemically crosslinking reaction may be a factor reducing a property of a solar cell because an initiator or a catalyst may be remained as an impurity in the electrolyte.

The poly(alkylene carbonate)-based polymer is not particularly limited, and may have a weight average molecular weight of preferably 1,000 to 1,000,000 g/mole in view of uniform dispersion of the ceramic particles and efficiency of gellation.

An example of the poly(alkylene carbonate)-based polymer represented by Formula 1 is not limited, but in consideration that phase separation does not occur due to high affinity to the organic solvent, the poly(alkylene carbonate)-based polymer may be preferably poly(ethylene carbonate), poly(propylene carbonate), poly(butylenes carbonate), poly(cyclohexyl carbonate), or a derivative and a mixture thereof.

The poly(alkylene carbonate)-based polymer may be included in a content of preferably 5 to 95 wt % based on the total weight of the polymer electrolyte composition, when the content is less than 5 wt %, gelling of the electrolyte solution may not be sufficiently performed, and when the content is more than 95 wt %, a hard gel is formed but the rate of movement of ions slows, such that efficiency of the solar cell may be low due to low ion conductance.

The polymer electrolyte composition according to one general aspect of the present invention includes a redox derivative and a solvent as the electrolyte solution as well as the poly(alkylene carbonate)-based polymer.

The solvent is a high boiling point solvent, and it may be understood at the aforementioned and the following descriptions that the term "high boiling point solvent" means an organic solvent having a boiling point of more than 150° C. and preferably 200 to 500° C. or a salt melted at normal temperature or 30 to 100° C.

The solvent is not limited as long as the solvent satisfies the aforementioned condition, and in views of high polarity for dissolving salts well, examples of the high boiling point solvent may include carbonates such as ethylene carbonate or propylene carbonate and a cyclic derivative thereof, organic solvents such as lactones such as gamma-butyrolactone, and ionic liquid containing imidazolium or pyrrolidinium. Matters selected from the solvents may be used alone or in a mixture form. Herein, the ionic liquid is an ionic salt present in a liquid state at normal temperature from 30 to 100° C., and unlike an ionic salt compound containing metal cations and non-metal anions typically melted at the high temperature of 800° C. or more, the ionic salt present in a liquid state at the temperature of 100° C. or less is called the ionic liquid, and, in particular, the ionic liquid present in a liquid state at normal temperature is called a normal temperature ionic liquid or normal temperature molten salt.

Meanwhile, the redox derivative provides redox couples of $I^-/I_3^-$ and may be formed from iodine and iodine salts, and the ions coexist and cause a reversible reaction.

The iodine salt is not limited, and examples thereof may include lithium iodide, sodium iodide, potassium iodide, magnesium iodide, copper iodide, silicon iodide, manganese iodide, molybdenum iodide, calcium iodide, iron iodide, cesium iodide, zinc iodide, mercury iodide, ammonium iodide, methyl iodide, methylene iodide, ethyl iodide, ethylene iodide, isopropyl iodide, isobutyl iodide, benzyl iodide, benzoyl iodide, allyl iodide, imidazolium iodide, and 1-methyl-3-propylimidazolium iodide.

In consideration of the ion conductance, the content of the iodine salt is 0.01 to 10.0 M and preferably 0.1 to 1.0 M.

Further, it is preferable that the content of the iodine be 0.01 to 0.1 M in view of ensuring high efficiency of the solar cell.

The polymer electrolyte composition according to one general aspect of the present invention includes the poly(alkylene carbonate)-based polymer and the electrolyte solution, and further includes ceramic particles to improve gelling, ion conductance, and light scattering properties.

Particles such as alumina ($Al_2O_3$), silica ($SiO_2$), titanium dioxide ($TiO_2$), $SnO_2$, $CeO_2$, $ZrO_2$, $BaTiO_3$, $Y_2O_3$ or zeolite may be added alone or in a mixture form of two different kinds or more as examples of the ceramic particles. The size of the ceramic particle is not limited, but is 0.0001 to 1,000 µm and preferably 0.001 to 1 µm to ensure uniform dispersion and control the thickness of the electrolyte.

It is preferable that the content of the added ceramic particle be 2 to 20 wt % based on the total weight of the electrolyte composition. When the content of the ceramic particle is less than 2 wt %, an improvement effect of ion conductivity is hardly shown, and when the content is more than 20 wt %, flexibility of the gel polymer electrolyte is reduced and ion conductance is reduced again due to an agglomeration phenomenon of the ceramic particles, which negatively affects improvement in efficiency of the solar cell.

In addition, the polymer electrolyte composition of the present invention may further include known components such as an open voltage increasing agent included in the polymer electrolyte of the dye-sensitized solar cell as long as the object of the present invention is capable of being accomplished.

The polymer electrolyte composition of the present invention does not include the initiator, the catalyst, and the like for the chemical crosslinking reaction, and may be physically gelled easily at normal temperature to manufacture a gel-type polymer electrolyte.

The polymer electrolyte is useful as an electrolyte of the dye-sensitized solar cell.

In an operation principle of the dye-sensitized solar cell, when the sun's rays are incident on the cell, photons are absorbed by the dye. The dye is in an excitation state, electrons are moved to a conduction band of $TiO_2$ and then to an electrode to flow through an external circuit, which generates electric energy. The dye is in an original state by receiving electrons from the electrolyte as the same number as the electrons move to $TiO_2$, and the used electrolyte is a redox couple such as iodide ($I^-$)/triodide ($I_3^-$) and serves to receive the electrons from the counter electrode and transport the electrons to the dye by the redox reaction. The open circuit voltage of the solar cell is determined by a difference between a Fermi energy level of the $TiO_2$ semiconductor and a redox level of the electrolyte.

A method of manufacturing the dye-sensitized solar cell to implement the operation principle is not particularly limited, and an example thereof is described below.

The following dye-sensitized solar cell is an example of a form where the photoelectrode containing the dye formed thereon and the counter electrode face each other and the gel-type electrolyte is disposed therebetween.

Specifically, the photoelectrode includes a nano-oxide layer where the dye is adsorbed on the transparent conductive electrode. The transparent conductive electrode is an electrode where conductive oxides such as fluorinated tin oxide (FTO) doped with fluorine or indium tin oxide (ITO) are applied on a transparent substrate such as glass. The substrate may use a transparent material without limitation as long as the material is transparent enough to allow sun's rays to be incident, and may be made of plastics such as, polycarbonate, or polyethylene carbonate. The nano-oxide layer is formed of a composition containing one kind or more metal oxides selected from the group consisting of titanium dioxide ($TiO_2$), tin dioxide ($SnO_2$), zinc oxide (ZnO), and tungsten oxide ($WO_3$), and is a layer on which the dye is adsorbed. It is preferable that the thickness of the nano-oxide layer be 5 to 20 µm. The dye may be adsorbed by using a ruthenium complex or a solution incorporating an organic dye. The ruthenium complex absorbing visible rays may be used as the dye, and any dye may be used as long as that is capable of efficiently absorbing visible rays and emitting electrons.

A matter where a platinum catalyst is formed on a transparent conductive electrode is used as the counter electrode. The platinum layer may be obtained by dropping a hexachloroplatinic acid ($H_2PtCl_6$) solution containing platinum dissolved therein on a transparent conductive electrode, performing spin coating, and performing heat treatment at 400 to 600° C. for 10 to 60 min. In addition, the platinum layer may be formed by using a sputtering method, a chemical vapor deposition method, a vapor deposition method, a thermal oxidation method, an electrochemical plating method, and the like. Herein, platinum applied on the counter electrode acts as a catalyst of a reduction reaction of redox couples.

After the manufactured photoelectrode containing the nano-oxide layer where the dye is adsorbed and the platinum counter electrode are set to face each other, the gel-type polymer electrolyte is interposed therebetween.

The gel-type polymer may be easily obtained by performing agitation and cast the polymer electrolyte composition according to one general aspect of the present invention at normal temperature.

A thermoplastic film may be applied to attach the gel-type polymer electrolyte and both electrodes, and when the thermoplastic film having the thickness of 25 to 60 μm is interposed between both electrodes and then maintained at 60 to 120° C. for 5 to 20 sec to attach the two electrodes, the dye-sensitized solar cell containing the electrode and the electrolyte integrated with each other may be manufactured.

The dye-sensitized solar cell containing the polymer electrolyte composition according to the present invention shows excellent cell property and durability.

A better understanding of the present invention may be obtained in light of the following Examples which are set forth to illustrate, but are not to be construed to limit the present invention.

Example 1

Manufacturing of the Polymer Electrolyte

The poly(propylene carbonate) (weight average molecular weight: 202,000) and the electrolyte solution were mixed with the weight ratio of 15:85 to manufacture the polymer electrolyte.

0.5 M lithium iodide (LiI), 0.05 M iodine ($I_2$), and 0.5 M 4-tert-butylpyridine were dissolved in the ethylene carbonate/gamma-butyrolactone mixture solvent (weight ratio 50:50) to manufacture the used electrolyte solution.

The gel-type polymer electrolyte was manufactured by casting under an anhydrous atmosphere condition after mixing with the magnetic stirrer at normal temperature.

Example 2

Manufacturing of the Polymer Electrolyte

The gel-type polymer was manufactured by the same method as the aforementioned procedure, Example 1, except of the ratio of 20:80 in weight between the poly(propylene carbonate) and the electrolyte solution.

Examples 3 to 7

Manufacturing of the Polymer Electrolyte

Alumina (average particle diameter 2 to 4 nm) as the ceramic particle was further added according to the content of the Table 1, which is based on the total weight of the polymer electrolyte composition in Example 2 to manufacture the gel-type polymer.

TABLE 1

| Example | Alumina content (wt %) |
|---------|------------------------|
| 1 | 0 |
| 2 | 0 |
| 3 | 2 |
| 4 | 4 |
| 5 | 6 |
| 6 | 8 |
| 7 | 10 |

Example 8

The gel-type polymer electrolyte was manufactured according to the same method with Example 4, except that poly(propylene carbonate) with the weight average molecular weight of 157,000 was used instead of poly(propylene carbonate) of the weight average molecular weight of 202,000.

Example 9

The gel-type polymer electrolyte was manufactured according to the same method with Example 4, except of the mixing ratio of poly(propylene carbonate) and the electrolyte solution, 75:25.

Example 10

The gel-type polymer electrolyte was manufactured by the aforementioned procedure, Example 4, except that 4.0 wt % of silica of the average particle diameter: 300 was used instead of alumina as the ceramic particle.

Comparative Example 1

Poly(propylene carbonate) was not added, which was used in Example 1 to manufacture the liquid electrolyte.

Comparative Example 2

The polymer electrolyte was manufactured according to the same method with Example 1, except that poly(vinylidene fluoride-hexafluoropropylene) copolymer (average molecular weight: 380,000, Kynar 2801) was used instead of poly(propylene carbonate) when the gel polymer electrolyte was manufactured.

Test Example 1

The gel-type polymer electrolytes obtained from Examples 1 to 10 and the electrolytes obtained from Comparative examples 1 and 2 were evaluated in terms of phase separation between the solvent and the polymer, the degree of gellaton, occurrence of an agglomeration phenomenon of ceramic particles, and the ion conductivity, and the results are filed up in the following Table 2.

TABLE 2

| Classification | Phase separation phenomenon | Gelation | Agglomeration of ceramic particles | Ion conductance (S/cm) |
|---|---|---|---|---|
| Example 1 | X | ○ | — | $7.2 \times 10^{-4}$ |
| Example 2 | X | ○ | — | $5.0 \times 10^{-4}$ |
| Example 3 | X | ○ | X | $6.5 \times 10^{-4}$ |
| Example 4 | X | ○ | X | $6.8 \times 10^{-4}$ |
| Example 5 | X | ○ | X | $5.1 \times 10^{-4}$ |
| Example 6 | X | ○ | X | $3.8 \times 10^{-4}$ |
| Example 7 | X | ○ | Δ | $1.1 \times 10^{-4}$ |
| Example 8 | X | ○ | X | $7.1 \times 10^{-4}$ |
| Example 9 | X | ○ | X | $4.2 \times 10^{-4}$ |
| Example 10 | X | ○ | X | $5.1 \times 10^{-4}$ |
| Comparative example 1 | — | — | — | $5.4 \times 10^{-3}$ |
| Comparative example 2 | X | X | — | $2.3 \times 10^{-3}$ |

On the description of Table 2, X means that the corresponding phenomenon does not occur, Δ means that the corresponding phenomenon slightly occurs, and ○ means that the corresponding phenomenon actively occurs.

Examples 11 to 20

Manufacturing of the Dye-Sensitized Solar Cell (1) Manufacturing of the Dye-Adsorbed Titanium Dioxide Photoelectrode The butanol solution with 2 wt % of titanium (IV) isopropoxide dissolved therein was applied by spin coating on the transparent conductive substrate coated with fluorine-doped indium oxide (FTO), and then treated with heat at 450° C. for 30 min to form the blocking layer. The coating composition (Ti-Nanoxide T20/SP, Solaronix) with titanium dioxide was applied for the transparent conductive electrode by the doctor blade method and treated with heat at 450° C. for 30 min to form the $TiO_2$ nano-oxide layer having the thickness of 10 to 15 μm. 0.3 mM N719 (Solaronix, Co., Ltd.) that was the ruthenium-based photosensitive dye and cis-diisothiocyanato-bis(2,2'-bipyridyl-4,4'-dicarboxylato)ruthenium(II)bis (tetrabutylammonium) were dissolved in the mixture solvent of acetonitrile and t-butanol (weight ratio 50:50) to manufacture the dye solution. The manufactured $TiO_2$ electrode was immersed therein at 30° C. for 18 hours and then dried to manufacture the dye-adsorbed titanium dioxide photoelectrode.

(2) Manufacturing of the Platinum Counter Electrode

The isopropanol solution containing 0.01 M hexachloroplatinic acid ($H_2PtCl_6$) dissolved therein was applied by spin coating on the transparent conductive glass substrate coated with FTO and then treated with heat at 450° C. for 30 min to manufacture the platinum counter electrode coated with the platinum layer.

(3) Manufacturing of the Solar Cell

After the dye-adsorbed titanium dioxide photoelectrode and the platinum counter electrode were set to face each other, the gel polymer electrolyte manufactured in Examples 1 to 10 was provided between two electrodes by the casting method. After the hot melting film having the thickness of 25 μm was interposed between both electrodes, heat was applied at 90° C. for 10 sec to attach the two electrodes. They were aged at 50° C. for 1 hour to finally manufacture the dye-sensitized solar cell containing the electrode and the electrolyte integrated with each other.

Comparative Example 3

The dye-sensitized solar cell was manufactured according to the same procedure with Example 11, except that only the electrolyte solution obtained in Comparative example 1 was used for the electrolyte.

Comparative Example 4

The dye-sensitized solar cell was manufactured according to the same procedure with Example 11, except that the polymer electrolyte obtained in Comparative example 2 was used for the electrolyte.

Test Example 2

The dye-sensitized solar cells manufactured in Examples 11 to 20 and Comparative examples 3 and 4 were evaluated in terms of a cell performance by using the xenon white light and the AM 1.5 filter under incidence light of 100 mW/cm². An example of the current-voltage curve of the dye-sensitized solar cell obtained is shown in FIG. 1, and short-circuit current density ($J_{SC}$), open circuit voltage ($V_{OC}$), fill factor (FF), and efficiency values calculated from the graph are described in the following Table 3.

An example shown in FIG. 1 relates to the solar cells obtained in Examples 11 and 12 and Comparative examples 3 and 4.

TABLE 3

| Classification | Electrolyte | Short-circuit current density (mA/cm²) | Open circuit voltage (V) | Fill factor | Efficiency (%) |
|---|---|---|---|---|---|
| Example 11 | Example 1 | 13.49 | 0.76 | 0.54 | 5.48 |
| Example 12 | Example 2 | 12.50 | 0.76 | 0.54 | 5.13 |
| Example 13 | Example 3 | 12.73 | 0.76 | 0.58 | 5.62 |
| Example 14 | Example 4 | 13.19 | 0.77 | 0.60 | 6.10 |
| Example 15 | Example 5 | 12.20 | 0.77 | 0.61 | 5.73 |
| Example 16 | Example 6 | 11.48 | 0.78 | 0.61 | 5.46 |
| Example 17 | Example 7 | 10.59 | 0.78 | 0.61 | 5.04 |
| Example 18 | Example 8 | 13.02 | 0.77 | 0.55 | 5.56 |
| Example 19 | Example 9 | 12.21 | 0.75 | 0.55 | 5.07 |
| Example 20 | Example 10 | 13.09 | 0.78 | 0.56 | 5.75 |
| Comparative example 3 | Comparative example 1 | 14.39 | 0.68 | 0.65 | 6.39 |
| Comparative example 4 | Comparative example 2 | 12.65 | 0.72 | 0.52 | 4.74 |

From the results of Table 3, it can be seen that the short-circuit current density and the efficiency are decreased as the content of the polymer included in the polymer electrolyte is increased. The reason is because the ion conductivity of the polymer electrolyte is decreased to reduce the rate of movement of the ions present in the electrolyte.

In the case of Comparative example 3 that is an example of the dye-sensitized solar cell to which the liquid electrolyte of Comparative example 1 is applied, it can be seen that the short-circuit current density and the efficiency are as high as those of the quasi-solid dye-sensitized solar cell to which the polymer electrolytes of the Examples are applied.

Meanwhile, the dye-sensitized solar cell (Comparative example 4) to which the polymer electrolyte of Comparative example 2 that was the polymer electrolyte to which the polymer (poly(vinylidenefluoride-hexafluoropropylene)copolymer) used as a polymer matrix of a known dye-sensitized solar cell instead of the polymer matrix of the present invention was applied was applied had low efficiency as compared to the case where the polymer electrolytes of the Examples were applied.

Further, in case that the polymer electrolyte includes the ceramic particles with the nano size, the efficiency is improved when compared to the opposite case, and it can be seen that the efficiency is highest at the content of 4 wt %.

Figure 2:
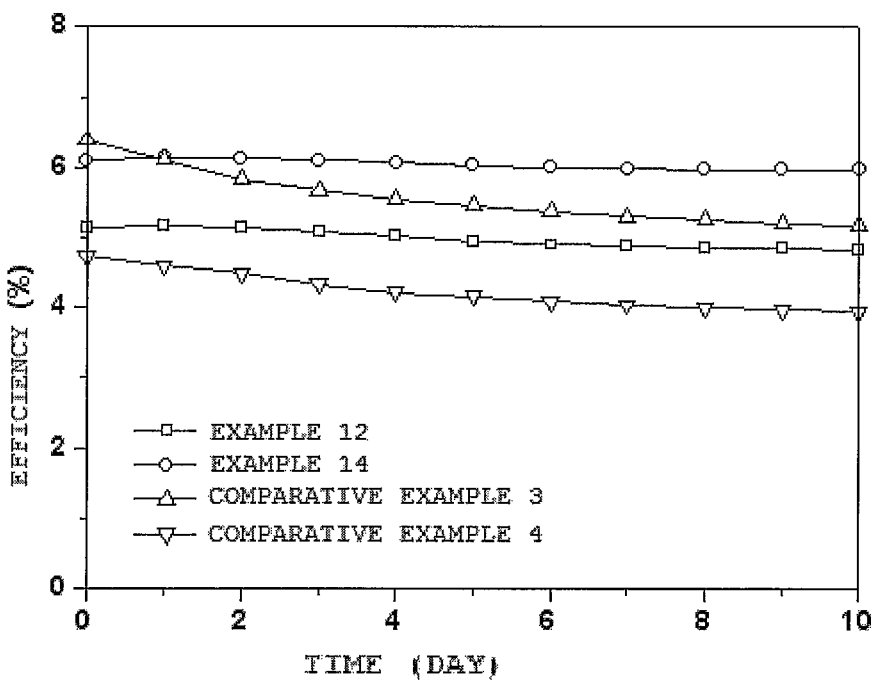
FIG. 2 is a graph obtained by measuring light conversion efficiencies of the dye-sensitized solar cells manufactured in Examples 12 and 14 and Comparative examples 3 and 4 of the present invention over the time.

Meanwhile, efficiencies of the dye-sensitized solar cells manufactured in Example 12 (the polymer electrolyte of Example 2 was included), Example 14 (the polymer electrolyte of Example 4 was included), and Comparative examples 3 and 4 were measured over the time to check the dye-sensitized solar cell for the stability over the time, and the results are shown in FIG. 2.

From FIG. 2, the initial efficiency of the dye-sensitized solar cell manufactured with the solid polymer electrolyte is slightly lower but the solar cell property is more stable over the time when compared to the dye-sensitized solar cell using the liquid electrolyte (Comparative example 3). Particularly, in case of the quasi-solid type dye-sensitized solar cell manufactured in Example 14, the 98% of the initial efficiency is maintained after 10 days and show excellent long term stability in comparison with the liquid type dye-sensitized solar cell (Comparative example 3) maintaining 81% of the initial efficiency and the dye-sensitized solar cell (Comparative example 4, 84% of the initial efficiency) manufactured with the poly(vinylidene fluoride-hexafluoropropylene) copolymer-based polymer electrolyte. The aforementioned results are due that the electrolyte solution is confined by the polymer electrolyte as gelling of the electrolyte solution proceeds and a uniform state is maintained without phase separation between two components due to the excellent affinity of the polymer to the organic solvent. As a result, a loss of liquid leakage of the cell is reduced as compared to the liquid electrolyte system, such that a more stable performance is ensured. Accordingly, long term stability is significantly improved by applying the polymer electrolyte to the dye-sensitized solar cell.

What is claimed is:

1. A polymer electrolyte composition for a dye-sensitized solar cell comprising:
   a poly(alkylene carbonate)-based polymer containing a repeating unit represented by the following Formula 1;
   a high boiling point solvent;
   a redox derivative; and
   a ceramic particle:

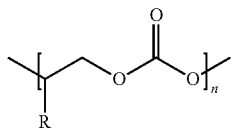

[Formula 1]

wherein R is a hydrogen atom; a straight chained, cyclic, or branched chained alkyl group having 1 to 20 carbon atoms, which may include a hetero element such as oxygen, sulfur or nitrogen and fluorine; or an aromatic alkyl group having 6 to 20 carbon atoms.

2. The polymer electrolyte composition of claim 1, wherein a weight average molecular weight of the poly(alkylene carbonate)-based polymer is 1,000 to 1,000,000.

3. The polymer electrolyte composition of claim 1, wherein the poly(alkylene carbonate)-based polymer is poly(ethylene carbonate), polypropylene carbonate), poly(butylenes carbonate), poly(cyclohexyl carbonate), or a mixture or a derivative thereof.

4. The polymer electrolyte composition of claim 1, wherein a content of the poly(alkylene carbonate)-based polymer is 5 to 95 wt %.

5. The polymer electrolyte composition of claim 1, wherein the high boiling point solvent is a single material or a mixture selected from cyclic carbonate, lactones, and normal temperature molten salts.

6. The polymer electrolyte composition of claim 1, wherein the high boiling point solvent is a single material or a mixture selected from methylene carbonate, ethylene carbonate, propylene carbonate, a cyclic derivative thereof, gamma-butyrolactone, and an ionic liquid.

7. The polymer electrolyte composition of claim 1, wherein the redox derivative provides a redox couple of $I^-/I_3^-$.

8. The polymer electrolyte composition of claim 1, wherein the ceramic particle is a single material or a mixture selected from $Al_2O_3$, $SiO_2$, $TiO_2$, $SnO_2$, $CeO_2$, $ZrO_2$, $BaTiO_3$, $Y_2O_3$, and zeolite.

9. The polymer electrolyte composition of claim 1, wherein an average particle diameter of the ceramic particle is 0.0001 to 1,000 μm.

10. The polymer electrolyte composition of claim 1, wherein a content of the ceramic particle is 2 to 20 wt %.

11. A gel-type polymer electrolyte for a dye-sensitized solar cell obtained by mixing the polymer electrolyte composition of claim 1 to perform gelling at normal temperature.

12. A dye-sensitized solar cell comprising:
    the gel-type polymer electrolyte of claim 11.

13. A dye-sensitized solar cell comprising:
    the polymer electrolyte composition of claim 1.

* * * * *